(12) United States Patent
Machulsky et al.

(10) Patent No.: US 7,899,763 B2
(45) Date of Patent: Mar. 1, 2011

(54) SYSTEM, METHOD AND COMPUTER PROGRAM PRODUCT FOR EVALUATING A STORAGE POLICY BASED ON SIMULATION

(75) Inventors: Zorik Machulsky, Gesher HaZiv (IL); Elad Yom-Tov, DN Hamovil (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 11/762,092

(22) Filed: Jun. 13, 2007

(65) Prior Publication Data

US 2008/0313109 A1 Dec. 18, 2008

(51) Int. Cl.
*G06F 15/18* (2006.01)
(52) U.S. Cl. ........................................................ 706/12
(58) Field of Classification Search .................... 706/12
See application file for complete search history.

(56) References Cited

U.S. PATENT DOCUMENTS

2005/0154576 A1* 7/2005 Tarui et al. .................... 703/22
2006/0224852 A1  10/2006 Kottomtharayil et al.

OTHER PUBLICATIONS

Vengerov "Dynamic Tuning of Online Data Migration Policies in Hierarchical Storage Systems using Reinforcement Learning", SMLI TR-2006-157 Jun. 2006.*
CA File System Manager: Intelligent Information Management for File System Data, Jun. 2006, pp. 1-9.
H.A. Bahr et al. "Smart priority queue algorithms for self-optimizing event storage", Simulation Modelling Practice and Theory, vol. 12, Issue 1, Apr. 2004, pp. 15-40.
Kyungbaek Kim, et al. "Efficient Resource Management for the P2P Web Caching", aict-sapir-elete, pp. 382-387, Advanced Industrial Conference on Telecommunications/Service Assurance with Partial and Intermittent Resources Conference/E-Learning on Telecommunications Workshop (AICT/SAPIR/ELETE'05), 2005.

* cited by examiner

*Primary Examiner*—Donald Sparks
*Assistant Examiner*—Li-Wu Chang

(57) ABSTRACT

A method for generating a storage policy, the method includes: receiving a storage system target function; and generating, by a machine learning entity, the storage policy in response to: (a) a set of file-related storage operation requests, (b) a state of the storage system before responding to the set of file-related storage operation requests, and (c) the storage system target function. A method for evaluating a storage policy, the method includes: simulating an application of the storage policy by the storage system during a first period, in response to a set of file-related storage operation requests that was provided to the storage system during the first period, to provide a simulation result; wherein the first period starts before the simulating.

32 Claims, 7 Drawing Sheets

SYSTEM, METHOD AND COMPUTER PROGRAM PRODUCT FOR EVALUATING A STORAGE POLICY BASED ON SIMULATION

FIELD OF THE INVENTION

The present invention relates to a method, a system and a computer program product for evaluating a storage policy.

BACKGROUND OF THE INVENTION

Storage systems usually include multiple storage components of different types such as, but not limited to, solid-state storage elements, disk drives, tapes, and CD-ROM drives. Different storage elements may be characterized by different access time, cost, reliability and the like. Data placement, i.e., the type and place of component used for storing each data element, has implications on the speed in which data is accessed, and on the risk of losing access or even losing the data as a result of a fault.

Management of data placement is implemented by data storage policies that are typically handled manually or implemented in script-like languages.

A storage policy typically includes rules for deciding where new files will be stored, rules for deciding if and where files should be moved to, and rules to determine if and when to erase files. The latter two types of rules are usually applied periodically to the storage system (e.g., every night).

The complexity of storage policies has dramatically increased recently, and this is partially due to the increasing amount of files that must be stored in a storage system, as well as due to the increasing numbers of storage components and storage component types that are included in the storage system.

There is a need to provide efficient methods, computer program products and a system for evaluating and generating a storage policy.

SUMMARY OF THE PRESENT INVENTION

In accordance with a first aspect of the present invention, a method for generating a storage policy is provided, the method includes: receiving a storage system target function; and generating, by a machine learning entity, the storage policy in response to: (a) a set of file-related storage operation requests, (b) a state of the storage system before responding to the set of file-related storage operation requests, and (c) the storage system target function.

Conveniently, the method includes simulating a response of the storage system to the set of file-related storage operations.

Conveniently, the method includes receiving, by the machine learning entity, a hard rule; and wherein the stage of generating includes generating, by the machine learning entity, the storage policy in response to the hard rule.

Conveniently, the method includes receiving, by the machine learning entity, a soft rule; and wherein the stage of generating includes generating, by the machine learning entity, the storage policy in response to the soft rule.

Conveniently, the method includes applying reinforced learning.

Conveniently, the method includes receiving an approval to implement the storage policy; and applying the storage policy by the storage system.

Conveniently, the method includes receiving, over a network, a request to generate the storage policy; and sending, over the network, information representative of the storage policy.

In accordance with a second aspect of the present invention a method for evaluating a storage policy is provided, the method includes: simulating an application of the storage policy by the storage system during a first period, in response to a set of file-related storage operation requests that was provided to the storage system during the first period, to provide a simulation result; wherein the first period starts before the simulating.

In accordance with a third aspect of the present invention a computer program product comprising a computer usable medium including a computer readable program is provided. The computer readable program when executed on a computer causes the computer to: receive a storage system target function and generate, by applying machine learning, a storage policy in response to: (a) a set of file-related storage operation requests, (b) a state of the storage system before responding to the set of file-related storage operation requests, and (c) the a storage system target function.

In accordance with a fourth aspect of the present invention a computer program product comprising a computer usable medium including a computer readable program is provided. The computer readable program when executed on a computer causes the computer to: simulate an application of the storage policy by the storage system during a first period, in response to a set of file-related storage operation requests that was provided to the storage system during the first period, to provide a simulation result; wherein the first period starts before the simulating.

In accordance with a fifth aspect of the present invention a system having storage policy generation capabilities is provided, the system comprises a storage unit adapted to store a storage system target function and a machine learning entity adapted to generate a storage policy in response to: (a) a set of file-related storage operation requests, (b) a state of the storage system before responding to the set of file-related storage operation requests, and (c) the storage system target function.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
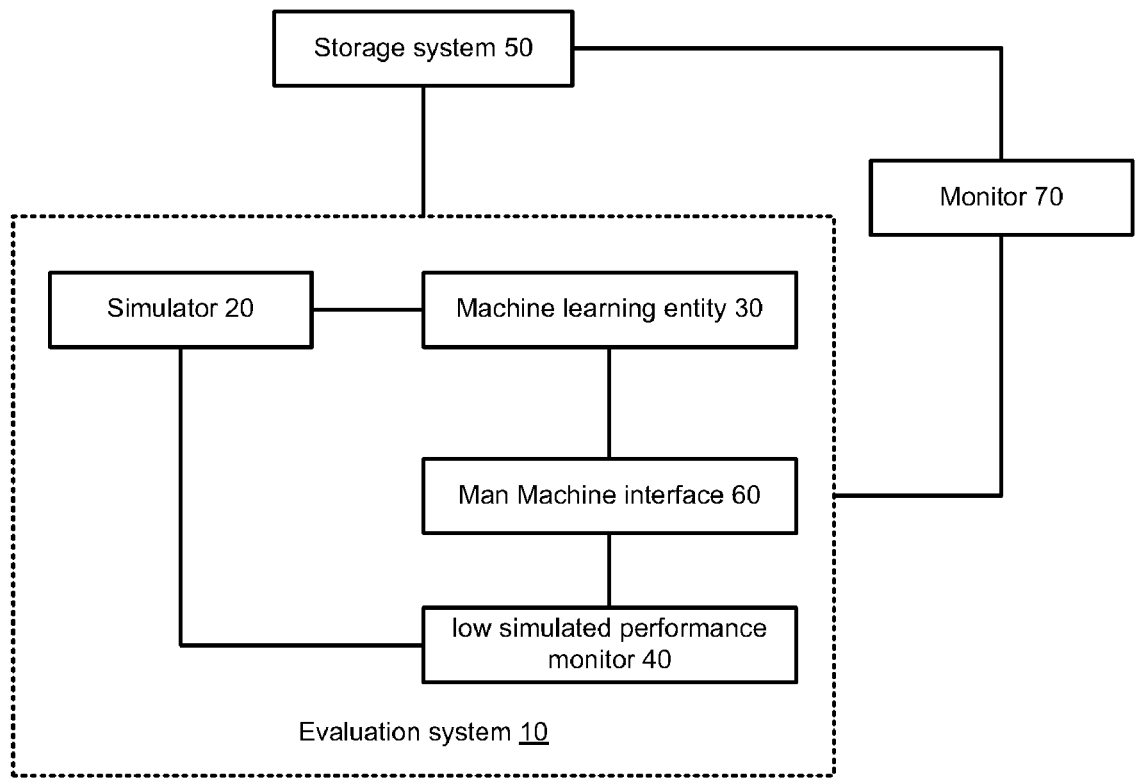
FIG. 1 illustrates an evaluation system, according to an embodiment of the invention.

FIG. 1 illustrates evaluation system 10 according to an embodiment of the invention.

Evaluation system 10 includes simulator 20, machine learning entity 30, and low simulated performance monitor 40. Simulator 20 is connected to machine learning entity 30 and to low simulated performance monitor 40.

Evaluation system 10 may be connected to storage system 50 and to a man machine interface unit 60 that may include a display, a keyboard, a touch screen, a microphone, a loudspeaker, a mouse and the like. Storage system 50 may include multiple storage components of different types.

It is noted that the mentioned above units may be connected over one or more networks, may have a distributed or a centralized architecture, may be implemented by hardware, software, firmware or by a combination thereof.

According to various embodiments of the invention evaluation system 10 may evaluate an existing storage policy, may generate a new storage policy, may assist in the application of a storage policy by storage system 50 or may perform a combination thereof.

Monitor 70 may monitor file-related storage operation requests (such as file read request, file write request, file delete request) that were sent to a storage system 50 during a first time period. Monitor 70 may also associate various attributes to the file-related storage operations requests such as the name of the file, the type of the file, the size of the file, the owner of the file, and the like.

Monitor 70 may be part of storage system 50 or may be included within evaluation system 10 but this is not necessarily so. For simplicity of explanation monitor 70 is illustrated as being connected to evaluation system 10 and to storage system 50.

Conveniently, simulator 20 receives: (i) storage system characteristics, and especially characteristics of the storage components that form storage system 50; (ii) a storage system target function; (iii) a state of the storage system before responding to the set of file-related storage operation requests (this state is also referred to as an initial state), and (iv) a set of file-related storage operation requests sent to the storage system, or rules for simulating file-related storage operation requests. Conveniently, simulator 20 also receives a storage policy. The storage policy may be actually implemented by storage system 50, but this is not necessarily so.

According to an embodiment of the invention simulator 20 provides a simulation result. A simulation result represents the state of the storage system had the storage policy being implemented when responding to the set of file-related storage operation requests and assuming that the system was at the initial state before responding to the set. The simulation result may be evaluated by another entity such as machine learning entity 30.

Storage system characteristics may include latency, cost, power consumption, bandwidth, Mean Time Between Failure (MTBF). The storage system target function may represent risk, time, cost, power consumption, bandwidth of a typical storage system performance. The storage system target function conveniently represents a statistical measure of the above. For example, simulator 20 may provide a simulation result that represents an average access time, and the probability of losing data.

The file-related storage operation requests sent to the storage system may be provided as one or more log files. It is noted that the log file may include file-related storage operations requests attributes (such as file name, owner, file type). It is further noted that the rules for simulating file-related storage operation requests may also define which attributes may be generated and when these attributes may be generated.

Conveniently, machine learning entity 30 may evaluate multiple evaluated storage policies by sending evaluated storage policies to simulator 20, requesting simulator 20 to simulate the application of each of the multiple evaluated storage policies by a storage system in order to provide multiple simulation results. The simulation results are sent to machine learning entity 30 that may apply machine learning techniques so as to select a storage policy out of the multiple evaluated storage policies. The selection may be responsive to a storage system target function. Thus, machine learning entity 30 may select the storage policy that provides the best results in view of the storage system target function.

It is noted that each evaluated storage policy may be evaluated by executing multiple simulation iterations. The simulation iterations may differ from each other by the simulated configuration of the storage system, by the set of file-related storage operation requests that are used during the simulation iteration, and the like.

Accordingly, in order to evaluate a storage policy, simulator 20 may receive multiple different sets of file-related-storage operation requests, including sets of file-related storage-related operation request that differ from the typical set. The sets may be provided to simulator 20 by machine learning entity 30 and to low simulated performance monitor 40.

It is noted that simulator 20 may receive rules for simulating file-related storage operation requests (usually instead of receiving a set of file-related storage requests). These rules (for simulating file-related storage operation requests) may be generated or altered by a user or by machine learning entity 30.

Conveniently, machine learning entity 30 may apply reinforced learning.

A basic reinforcement learning model includes a set of environment states, a set of actions and a set of scalar rewards. The set of environment states represents various simulated states of the storage system, starting from the initial state of the storage system and ending by a final state of the storage system, after responding to the whole set of file-related storage requests. The set of actions is defined by a group of evaluated storage policies. The reward represents the storage system target value.

According to an embodiment of the invention machine learning entity 30 may receive one or more hard rules and, alternatively or additionally receive one or more soft rules.

A hard rule is a rule which takes precedent over rules learnt by machine learning entity 30. For example, a storage period may be dictated by law. Accordingly, machine learning entity 30 will not suggest a storage policy that will enforce another storage period. A soft rule may illustrate what a user thinks to be a "good practice". Such a rule may be taken into account by machine learning entity 30 but is not mandatory.

As indicated above, evaluation system 10 may also evaluate storage polices that were not generated by evaluation system 10. For simplicity of explanation the following description will refer to a certain storage policy that was not generated by evaluation system 10, but merely evaluated by evaluation system 10 as a second storage policy.

According to an embodiment of the invention evaluation system 10 may evaluate the second storage policy by sending to simulator 20 a set of file-related storage operation requests that were sent to a storage system during a first period. Simulator 20 then simulates the applying of the second storage policy by a storage system, in response to the set of file-related storage operation requests sent to the storage system, to provide a simulation result. Simulator 20 or another component of evaluation system 10 may then determine a characteristic of the second storage policy in response both to the simulation result and to a storage system target function.

According to yet another embodiment of the invention evaluation system 10 may evaluate the second storage policy by sending to simulator 20 file-related storage operation requested simulation rules. Simulator 20 simulates the application of the second storage policy by the storage system, in response to file-related storage operation requested simulation rules, to provide a simulation result. Simulator 20 or another component of evaluation system 10 may determine a characteristic of the second storage policy in response both to the simulation result and to a storage system target function.

Groups of sets of file-related storage operation requests associated with a low-simulated performance of the second storage policy are sent to low-simulated performance monitor 40. The files requested by these sets are referred to as problematic files. Low-simulated performance monitor 40 analyzes the problematic files in order to find characteristics which typify the problematic files. These characteristics should be common to the problematic files but not to other files. Finding these characteristics may be done, for example, by applying tree-based classifiers (e.g., the ID3 algorithm, which is described by Quinlan, J. R., "Induction of Decision Trees", Machine Learning 1:81-106, 1986, Kluwer Academic Publisher, Boston, available also in http://www.cs.toronto.edu/~roweis/csc2515/readings/quin lan.pdf, and incorporated herein by reference to the present invention) to the problematic files, with the object of distinguishing problematic files from other files. If files which are typified by such sets of characteristics are found they are either displayed to the user so that he may set a new policy for these files or else the learned policy is modified accordingly.

Conveniently, low-simulated performance monitor 40 may cluster the problematic files.

Conveniently, low-simulated performance monitor 40 may display the problematic files to the user or may display cluster information representative of the clustering of the group of problematic files to sub-groups of problematic files.

The user may then decide if the second storage policy should be modified in view of the problematic sets.

Figure 2:
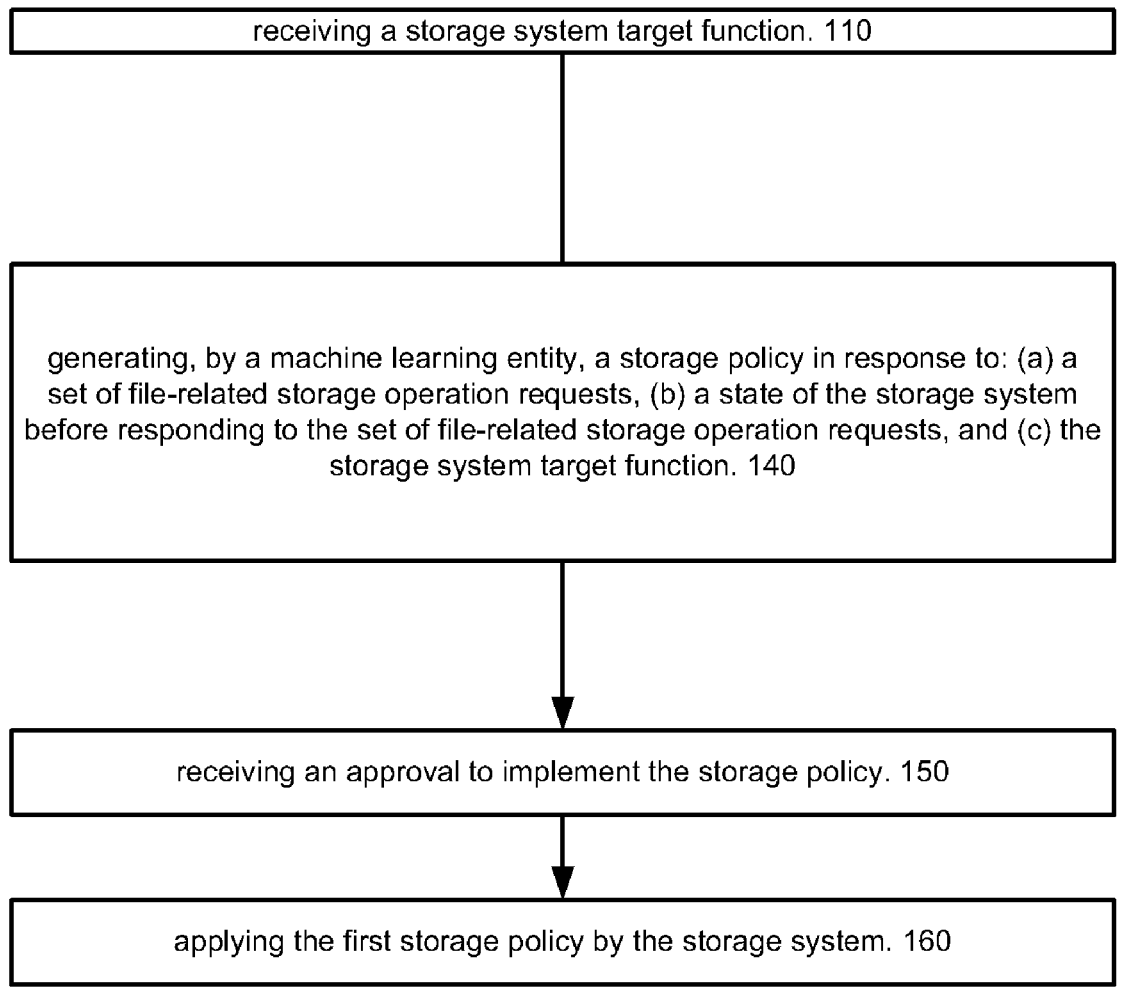
FIG. 2 illustrates a method for generating a storage policy, according to an embodiment of the invention.

FIG. 2 illustrates method 100 for generating a storage policy, according to an embodiment of the invention.

Method 100 starts by stage 110 of receiving a storage system target function.

Stage 110 is followed by stage 140 of generating, by a machine learning entity, a storage policy in response to: (a) a set of file-related storage operation requests, (b) a state of the storage system before responding to the set of file-related storage operation requests, and (c) the storage system target function.

Conveniently, stage 140 includes at least one of the following stages, or a combination thereof: (i) simulating a response of the storage system to the set of file-related storage operations, (ii) receiving a hard rule and in response generating, by the machine learning entity, the storage policy, (iii) receiving a soft rule and in response generating, by the machine learning entity, the storage policy; (iv) applying reinforced learning.

Stage 140 may be followed by stage 150 of receiving an approval to implement the storage policy and stage. Stage 150 is followed by stage 160 of applying the storage policy by the storage system.

Figure 3:
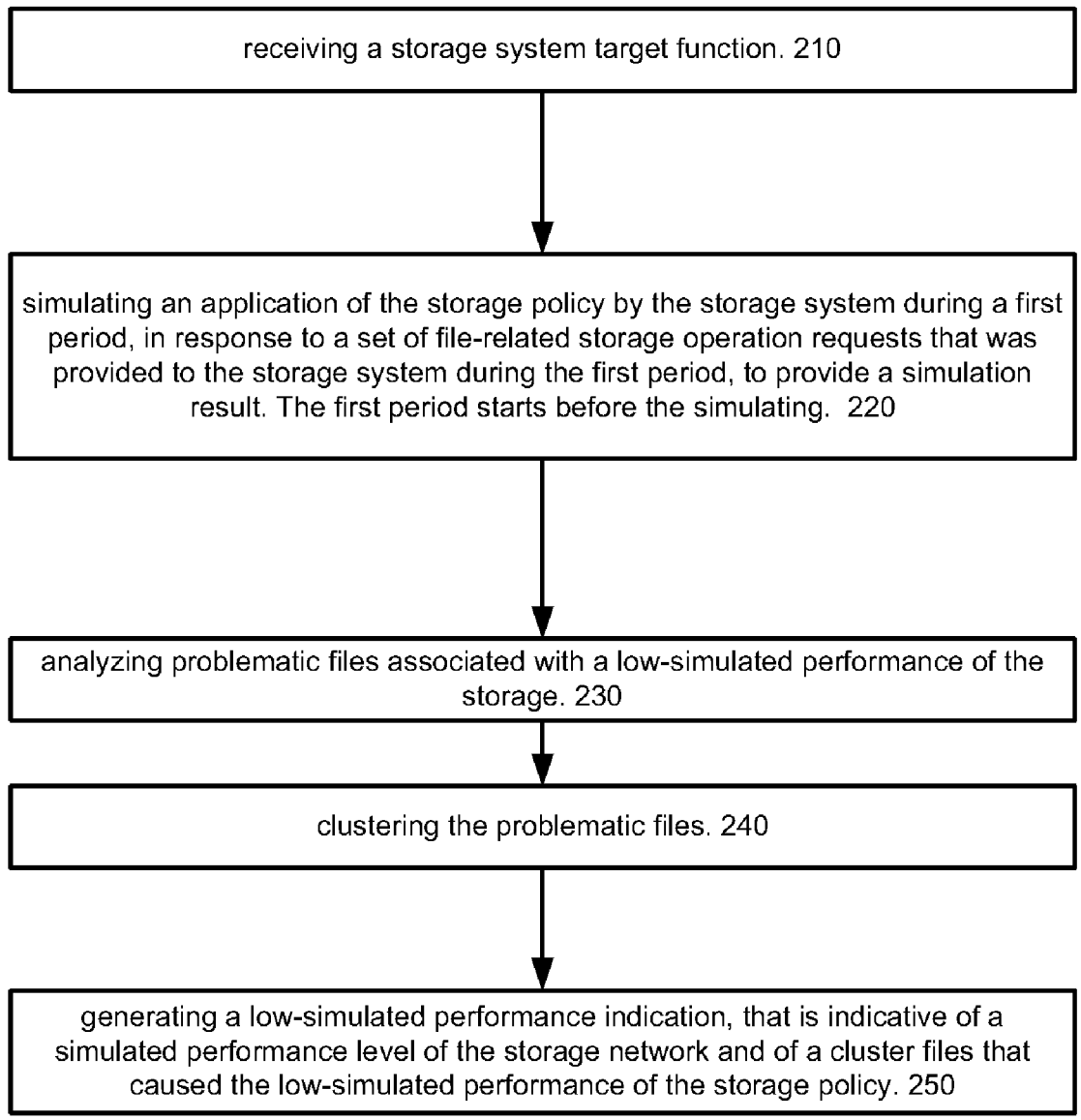
FIG. 3 is a flow chart of a method for evaluating a storage policy, according to an embodiment of the invention.

FIG. 3 is a flow chart of method 200 for evaluating a storage policy, according to an embodiment of the invention.

Method 200 starts by stage 210 of receiving a storage system target function.

Stage 210 is followed by stage 220 of simulating an application of the storage policy by the storage system during a first period, in response to a set of file-related storage operation requests that was provided to the storage system during the first period, to provide a simulation result. The first period starts before stage 220. Conveniently, the first period ends before the simulating.

It is noted that stage 220 may include simulating different storage system configurations, including one or more actual configurations and one or more theoretical configurations.

Stage 220 may be followed by stage 230 of analyzing problematic files associated with a low-simulated performance of the storage policy. Stage 230 may be executed by low-simulated performance monitor 40.

Stage 230 is followed by stage 240 of clustering the problematic files.

Stage 240 is followed by stage 250 of generating a low-simulated performance indication that is indicative of a simulated performance level of the storage system and of a cluster files that caused the low-simulated performance of the storage policy.

Figure 4:
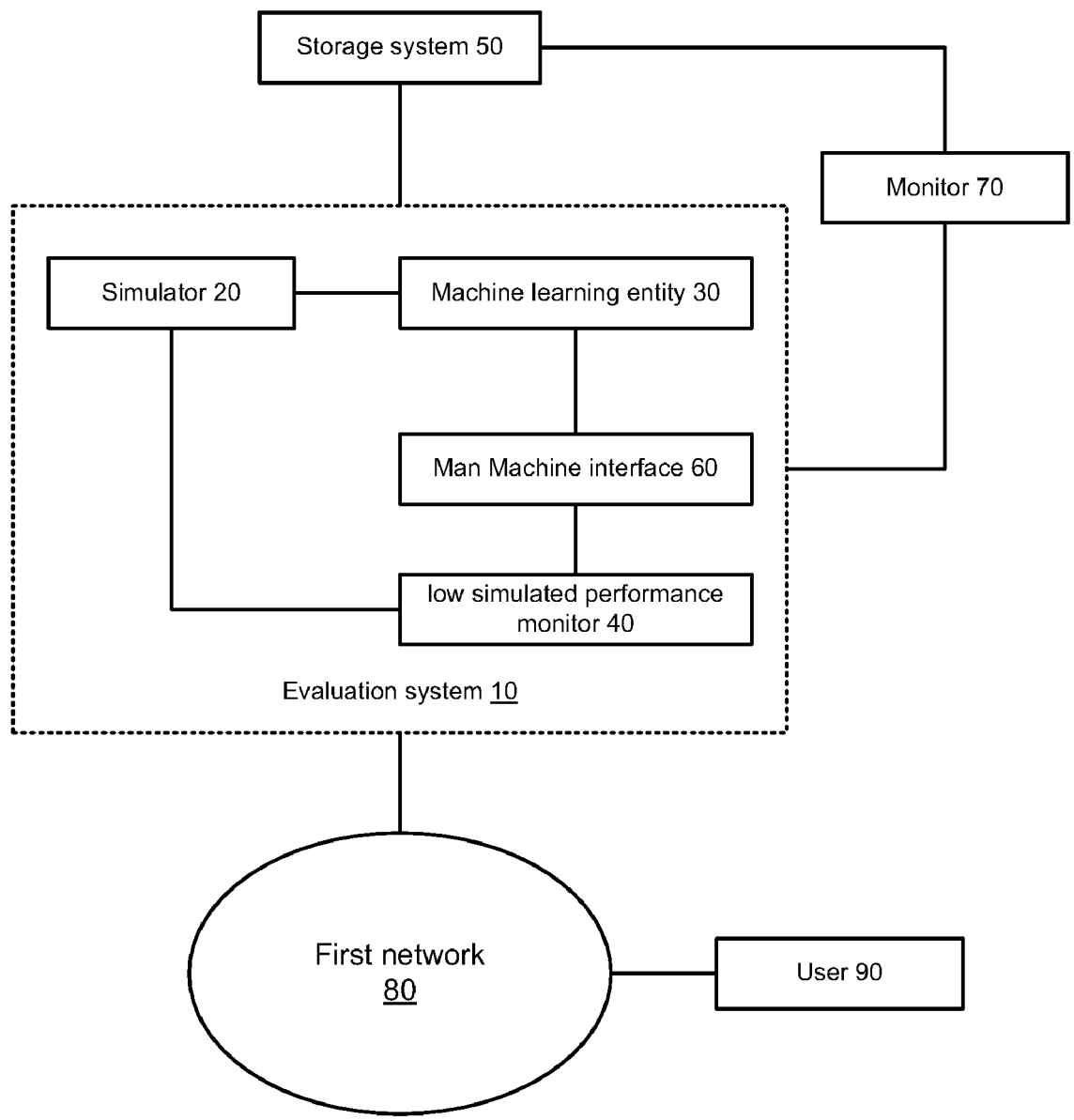
FIG. 4 illustrates an evaluation system and a first network, according to an embodiment of the invention.

FIG. 4 illustrates evaluation system 10 and first network 80, according to an embodiment of the invention.

Evaluation system 10 is connected to storage system 50 and monitor 70 (as illustrated in FIG. 1) but is also connected to first network 80 that in turn is connected a user 90. First Network 80 may be the Internet, a wide area network, a local area network and the like. The user may be located at one country while the evaluation system 10 may be located at another country.

Figure 5:
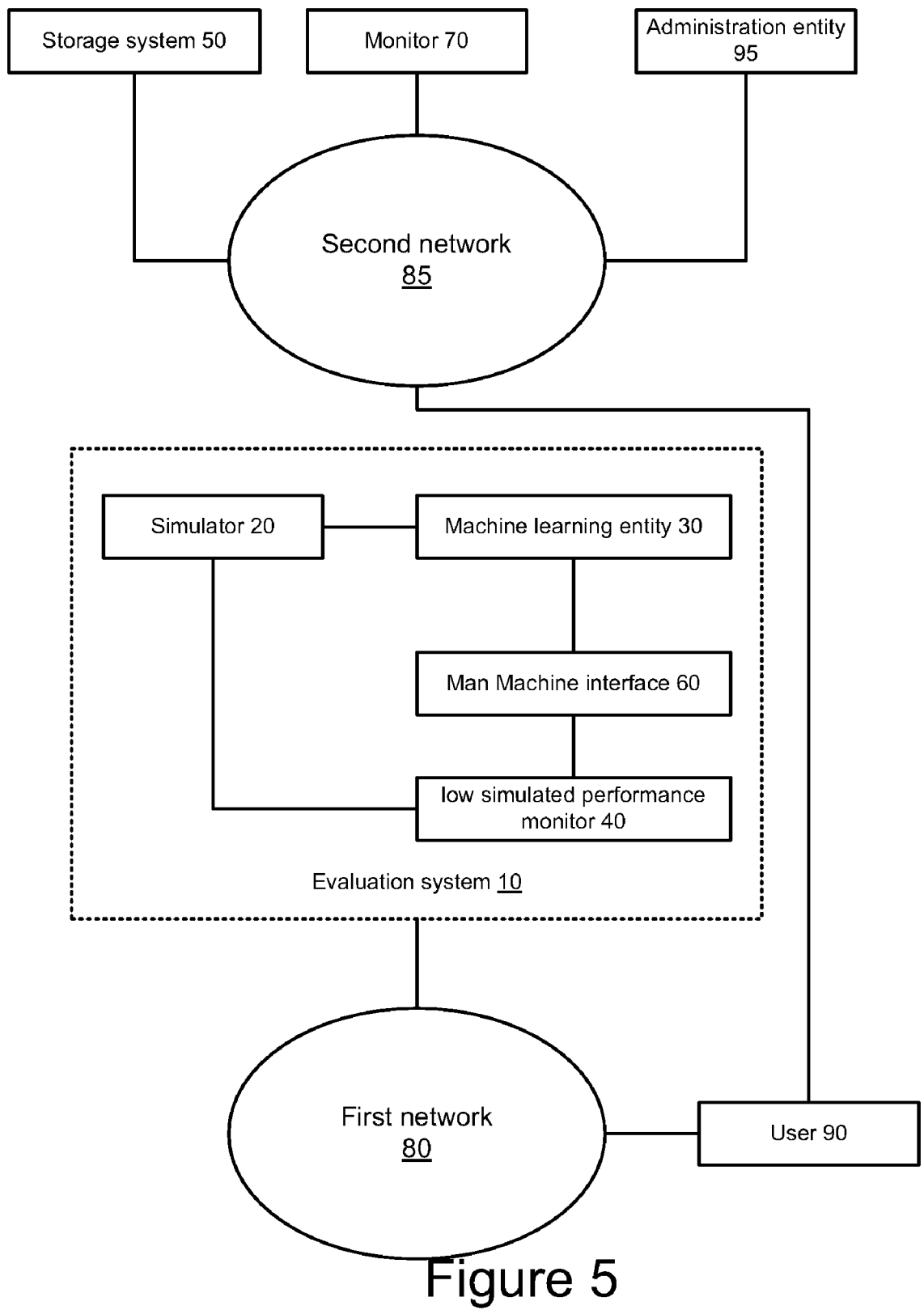
FIG. 5 illustrates an evaluation system, a first network and a second network, according to another embodiment of the invention.

FIG. 5 illustrates evaluation system 10, first network 80 and second network 85, according to another embodiment of the invention.

Second network 85 is connected to user 90, monitor 70, storage system 50 and an optional administration entity 95. Administration entity 95 may control an application of a storage policy by storage system 50. First network 80 is connected between user 90 and evaluation system 10. First Network 80 and/or second network 85 may be the Internet, a wide area network, a local area network and the like. The user may be located at one country while the evaluation system 10 may be located at another country. Evaluation system 10 is not connected to storage system 50. User 90 may send evaluation system 10 information relating to storage system 50 as well as requests to generate a storage policy or to update a storage policy via first network 80.

First network 80 enables user to receive services, from evaluation system 10.

Figure 6:
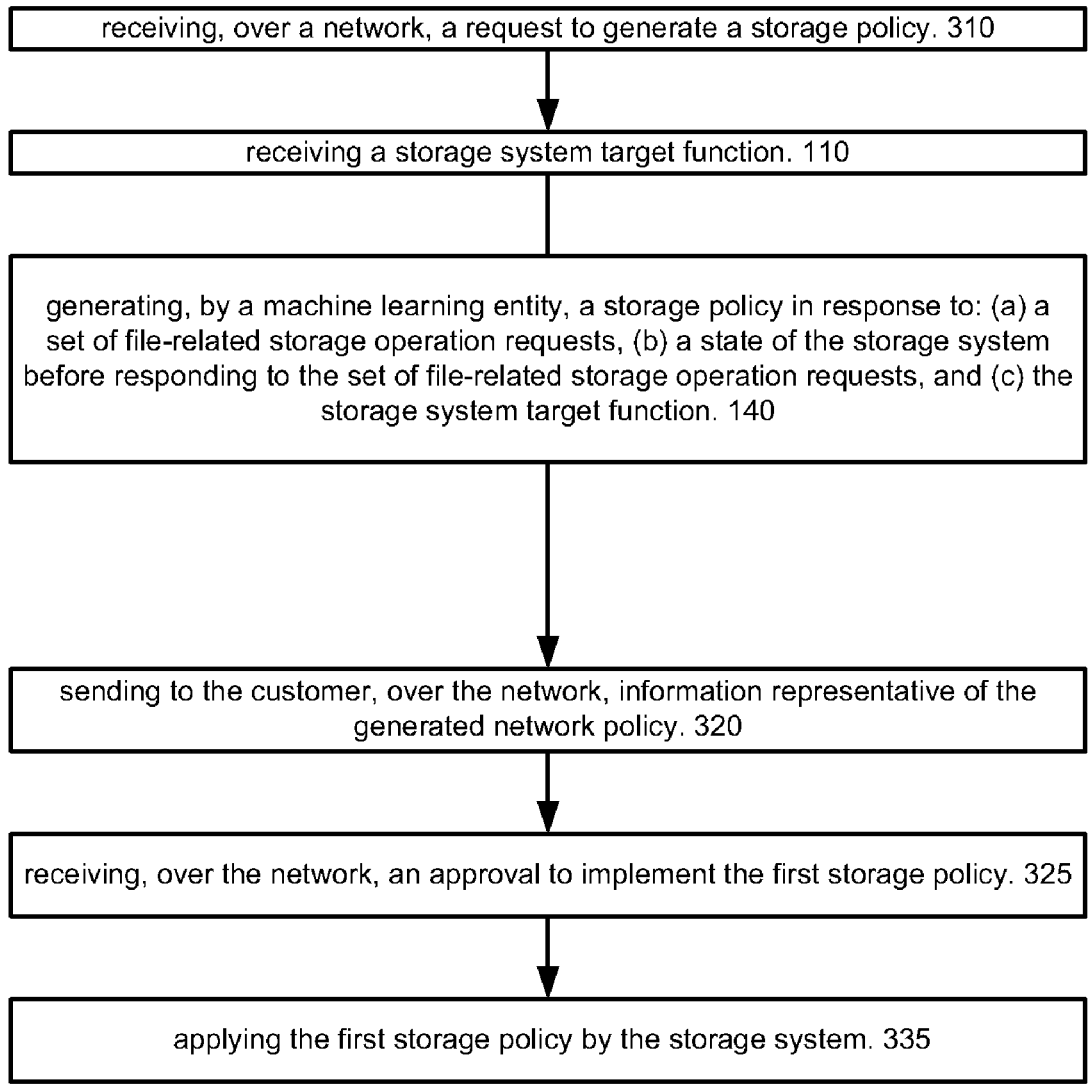
FIGS. 6-7 are flow charts of a method for providing a service to a customer over a network, according to various embodiments of the invention.

FIG. 6 illustrates method 300 for providing a service over a network, according to an embodiment of the invention.

Method 300 starts by stage 310 of receiving, over a network, a request to evaluate a storage policy.

Stage 310 is followed by stage 110 of receiving a storage system target function.

Stage 110 is followed by stage 140 of generating, by a machine learning entity, the storage policy in response to: (a) a set of file-related storage operation requests, (b) a state of the storage system before responding to the set of file-related storage operation requests, and (c) the storage system target function.

Conveniently, stage 140 includes at least one of the following stages, or a combination thereof: (i) simulating a response of the storage system to the set of file-related storage operations, (ii) receiving a hard rule and in response generating, by the machine learning entity, the storage policy, (iii) receiving a soft rule and in response generating, by the machine learning entity, the storage policy; (iv) applying reinforced learning.

Stage 140 is followed by stage 320 of sending to a customer, over the network, information representative of the generated storage policy.

Stage 320 may include requesting from the user to approve an application of the storage policy.

If such as request is sent then stage 320 may be followed by stage 325 of receiving, over the network, an approval to implement the storage policy.

Stage 325 may be followed by stage 335 of applying the storage policy by the storage system.

Figure 7:
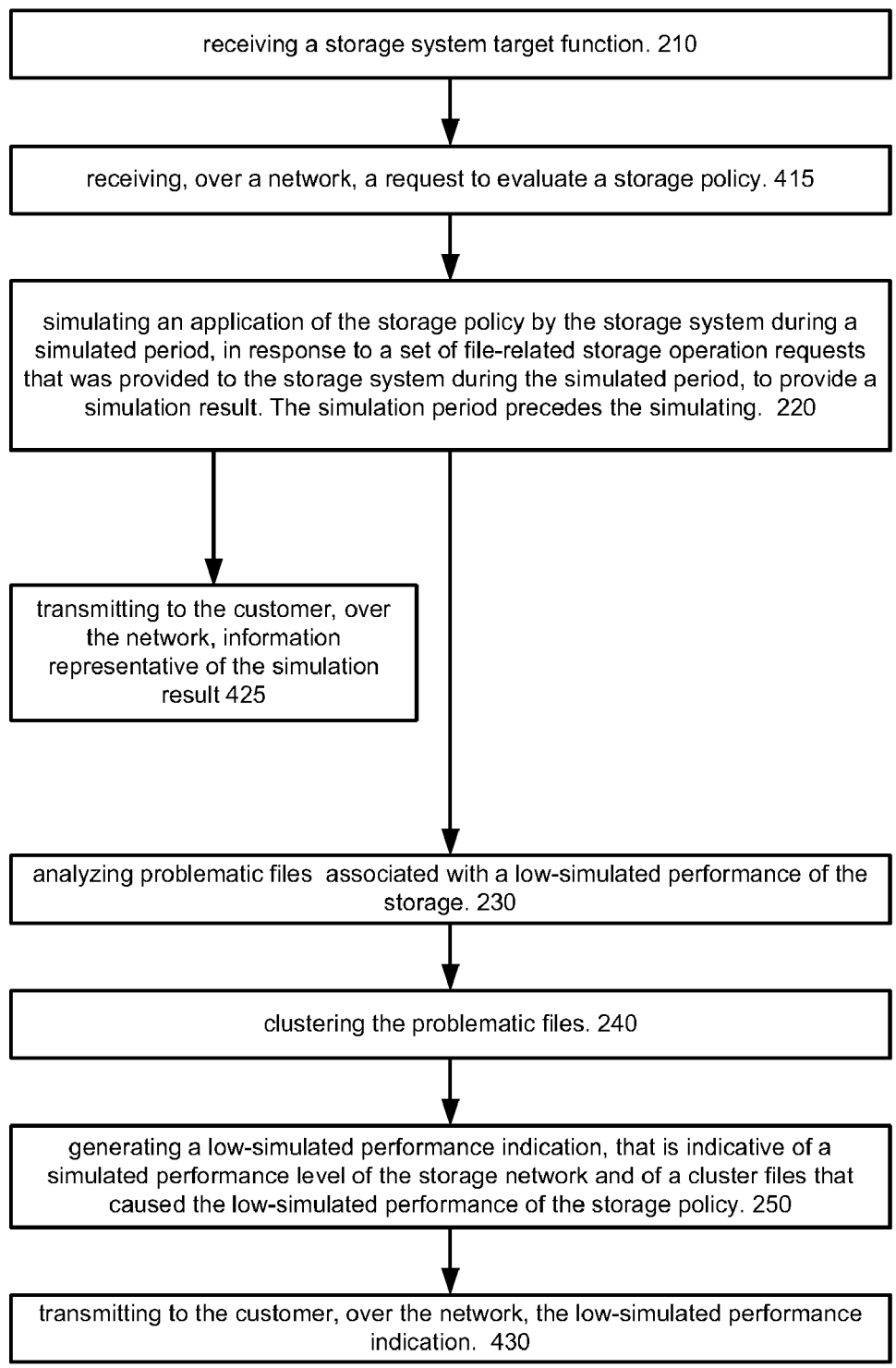

FIG. 7 is a flow chart of method 400 for providing a service over a network, according to an embodiment of the invention.

Method 400 starts by stage 210 of receiving a storage system target function.

Stage 210 is followed by stage 415 of receiving, over a network, a request to evaluate a storage policy. This network may include first network 80 of FIG. 5.

Stage 415 is followed by stage 220 of simulating an application of the storage policy by the storage system during a first period, in response to a set of file-related storage operation requests that was provided to the storage system during the first period, to provide a simulation result. The simulation period precedes the simulating.

Stage 220 is followed by stages 425 and 230. Stage 425 includes transmitting to the customer, over the network, information representative of the simulation result. Stage 425 may be followed by stage 440.

Stage 230 includes analyzing problematic files associated with a low-simulated performance of the storage policy. Stage 230 may be executed by low-simulated performance monitor 40.

Stage 230 is followed by stage 240 of clustering the problematic files.

Stage 240 is followed by stage 250 of generating a low-simulated performance indication that is indicative of a simulated performance level of the storage system and of a cluster files that caused the low-simulated performance of the storage policy.

It is noted that stage 250 may be followed by a stage 430 of transmitting to the customer, over the network, the low-simulated performance indication.

It is noted that method 300 and 400 may be combined and that the services that are provided to a customer over a network may include both evaluating storage policies and generating storage policies.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit of the scope of the invention as claimed.

Accordingly, the invention is to be defined not by the preceding illustrative description but instead by the spirit and scope of the following claims.

We claim:

1. A computer implemented simulation-based method for generating a storage policy for a storage system, the method comprising:
receiving a storage system target function that represents a measure of values associated with at least one of access rate, storage cost, power consumption, storage bandwidth and risk of data loss in the storage system;
determining simulation results associated with a state of the storage system based on (a) the storage system simulated response to a set of simulated file-related storage operation requests generated based on one or more simulation rules, (b) the state of the storage system before responding to the set of simulated file-related storage operation requests, (c) the storage system target function; and (d) rules for simulating file-related storage operation requests, wherein the simulation rules are generated or update based on one or more storage policies generated by way a machine learning entity applying reinforced learning;
generating a plurality of storage policies, by the machine learning entity, in response to analyzing the simulation results, wherein various simulation results represent various states of the storage system had a respective storage policy, from among said plurality of generated storage policies was implemented in response to the simulation results previously generated in response to the set of file-related storage operation requests as applied to a state of the storage system prior to a current simulation; and
depending on a currently recognized state of the storage system, using the machine learning entity to select the storage policy that provides the best results according to multiple simulation results by simulating the application of each of the multiple evaluated storage policies by a storage system in view of the storage system target function,
wherein the one or more storage policies derived from the simulation are applied within limits defined by one or more mandatory constraints or one or more preferential constraints set without regard to the generated simulation results.

2. The method according to claim 1 further comprising simulating a response of the storage system to the set of file-related storage operations.

3. The method according to claim 1 further comprising receiving a hard rule defining the one or more mandatory constraints; and wherein the stage of generating comprises generating, by the machine learning entity, the storage policy in response to the hard rule.

4. The method according to claim 1 further comprising receiving a soft rule defining the one or more preferential constraints; and wherein the stage of generating comprises generating, by the machine learning entity, the storage policy in response to the soft rule.

5. The method according to claim 1 wherein the generating comprises applying reinforced learning.

6. The method according to claim 1 further comprising receiving an approval to implement the storage policy; and applying the storage policy by the storage system.

7. The method according to claim 1 further comprising: receiving, over a network, a request to generate the storage policy; and sending, over the network, information representative of the storage policy.

8. The method according to claim 1 further comprising analyzing problematic files associated with results of application of a storage policy derived from a simulation, wherein application of said storage policy resulted in an unsatisfactory performance level for the storage system.

9. The method according to claim 8 further comprising clustering the problematic files.

10. The method according to claim 8 further comprising generating a low-simulated performance indication that is indicative of a simulated performance level of the storage system and of a cluster of problematic files.

11. The method according to claim 1 further comprising repeating the simulating for different storage system configurations to derive the various simulation results.

12. The method according to claim 1 further comprising receiving, over a network, a request to evaluate a storage policy; and sending, over the network, information representative of the simulation result.

13. A system for generating a storage policy for a storage system, the system comprising:
 a simulator for receiving a storage system target function that represents a measure of values associated with at least one of access rate, storage cost, power consumption, storage bandwidth and risk of data loss in the storage system;
 a processor for determining simulation results associated with a state of the storage system based on (a) the storage system simulated response to a set of simulated file-related storage operation requests generated based on one or more simulation rules, (b) the state of the storage system before responding to the set of simulated file-related storage operation requests, (c) the storage system target function; and (d) rules for simulating file-related storage operation requests, wherein the simulation rules are generated or update based on one or more storage policies generated by way a machine learning entity applying reinforced learning;
 a machine learning entity generating a plurality of storage policies, in response to analyzing the simulation results, wherein various simulation results represent various states of the storage system had a respective storage policy, from among said plurality of generated storage policies was implemented in response to the simulation results previously generated in response to the set of file-related storage operation requests as applied to a state of the storage system prior to a current simulation; and
 the machine learning unit entity depending on a currently recognized state of the storage system, selecting the storage policy that provides the best results according to multiple simulation results by simulating the application of each of the multiple evaluated storage policies by a storage system in view of the storage system target function,
 wherein the one or more storage policies derived from the simulation are applied within limits defined by one or more mandatory constraints or one or more preferential constraints set without regard to the generated simulation results.

14. The system according to claim 13 further the simulator simulates a response of the storage system to the set of file-related storage operations.

15. The system according to claim 13 wherein the machine learning entity receives a hard rule defining the one or more mandatory constraints; and wherein the stage of generating comprises generating, by the machine learning entity, the storage policy in response to the hard rule.

16. The system according to claim 13 wherein the learning machine learning entity receives a soft rule defining the one or more preferential constraints; and wherein the stage of generating comprises generating, by the machine learning entity, the storage policy in response to the soft rule.

17. The system according to claim 13 wherein the generating comprises applying reinforced learning.

18. The system according to claim 13 further comprising receiving an approval to implement the storage policy; and applying the storage policy by the storage system.

19. The system according to claim 13 further comprising: receiving, over a network, a request to generate the storage policy; and sending, over the network, information representative of the storage policy.

20. The system according to claim 13 further comprising analyzing problematic files associated with results of application of a storage policy derived from a simulation, wherein application of said storage policy resulted in an unsatisfactory performance level for the storage system.

21. The system according to claim 20 further comprising clustering the problematic files.

22. The system according to claim 20 further comprising generating a low-simulated performance indication that is indicative of a simulated performance level of the storage system and of a cluster of problematic files.

23. A computer program product accessible via a non-transitory computer readable medium with a computer readable program stored thereon, wherein the computer readable program when executed on a computer causes the computer to:
 receive a storage system target function that represents a measure of values associated with at least one of access rate, storage cost, power consumption, storage bandwidth and risk of data loss in the storage system;
 determine simulation results associated with a state of the storage system based on (a) the storage system simulated response to a set of simulated file-related storage operation requests generated based on one or more simulation rules, (b) the state of the storage system before responding to the set of simulated file-related storage operation requests, (c) the storage system target function; and (d) rules for simulating file-related storage operation requests, wherein the simulation rules are generated or update based on one or more storage policies generated by way a machine learning entity applying reinforced learning;
 generate a plurality of storage policies, by the machine learning entity, in response to analyzing the simulation results, wherein various simulation results represent various states of the storage system had a respective storage policy, from among said plurality of generated storage policies was implemented in response to the simulation results previously generated in response to the set of file-related storage operation requests as applied to a state of the storage system prior to a current simulation; and depending on a currently recognized state of the storage system, using the machine learning entity to select the storage policy that provides the best results according to multiple simulation results by simulating the application of each of the multiple evaluated storage policies by a storage system in view of the storage system target function, wherein the one or more storage policies derived from the simulation are applied within limits defined by one or more mandatory constraints or one or more preferential constraints set without regard to the generated simulation results.

24. The computer program product according to claim 23, wherein the computer readable program, when executed on a computer, further causes the computer to simulate a response of the storage system to the set of file-related storage operations.

25. The computer program product according to claim 23, wherein the computer readable program, when executed on a computer, further causes the computer to receive a hard rule defining the one or more mandatory constraints; and wherein the stage of generating comprises generating, by the machine learning entity, the storage policy in response to the hard rule.

26. The computer program product according to claim 23, wherein the computer readable program, when executed on a computer, further causes the computer to receive a soft rule defining the one or more preferential constraints; and wherein the stage of generating comprises generating, by the machine learning entity, the storage policy in response to the soft rule.

27. The computer program product according to claim 23 wherein the generating comprises applying reinforced learning.

28. The computer program product according to claim 23, wherein the computer readable program, when executed on a computer, further causes the computer to receive an approval to implement the storage policy; and applying the storage policy by the storage system.

29. The computer program product according to claim 23, wherein the computer readable program, when executed on a computer, further causes the computer to receive, over a network, a request to generate the storage policy; and sending, over the network, information representative of the storage policy.

30. The computer program product according to claim 23, wherein the computer readable program, when executed on a computer, further causes the computer to analyze problematic files associated with results of application of a storage policy derived from a simulation, wherein application of said storage policy resulted in an unsatisfactory performance level for the storage system.

31. The computer program product according to claim 30, wherein the computer readable program, when executed on a computer, further causes the computer to cluster the problematic files.

32. The computer program product according to claim 30, wherein the computer readable program, when executed on a computer, further causes the computer to generate a low-simulated performance indication that is indicative of a simulated performance level of the storage system and of a cluster of problematic files.

* * * * *